Patented Sept. 22, 1931

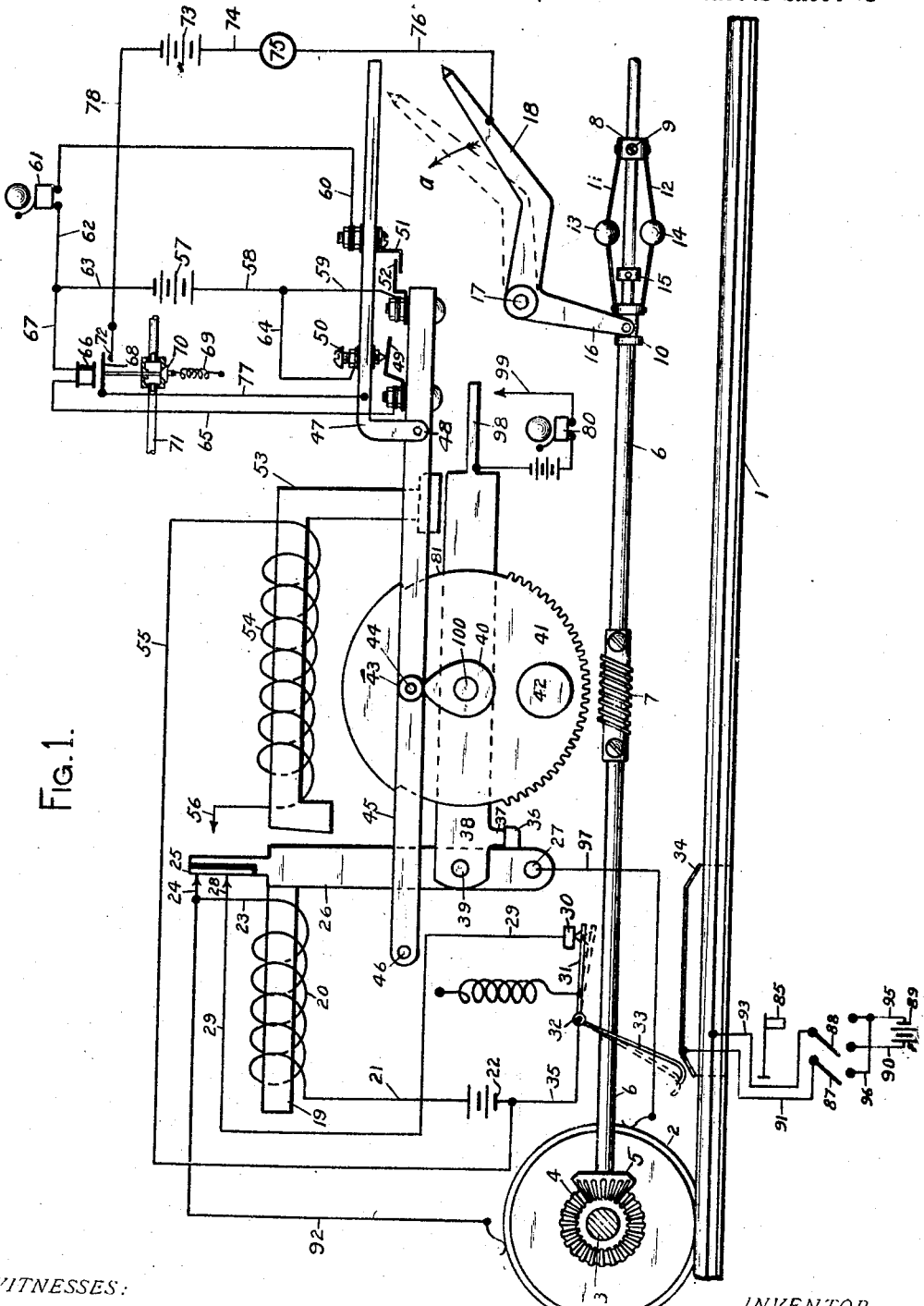

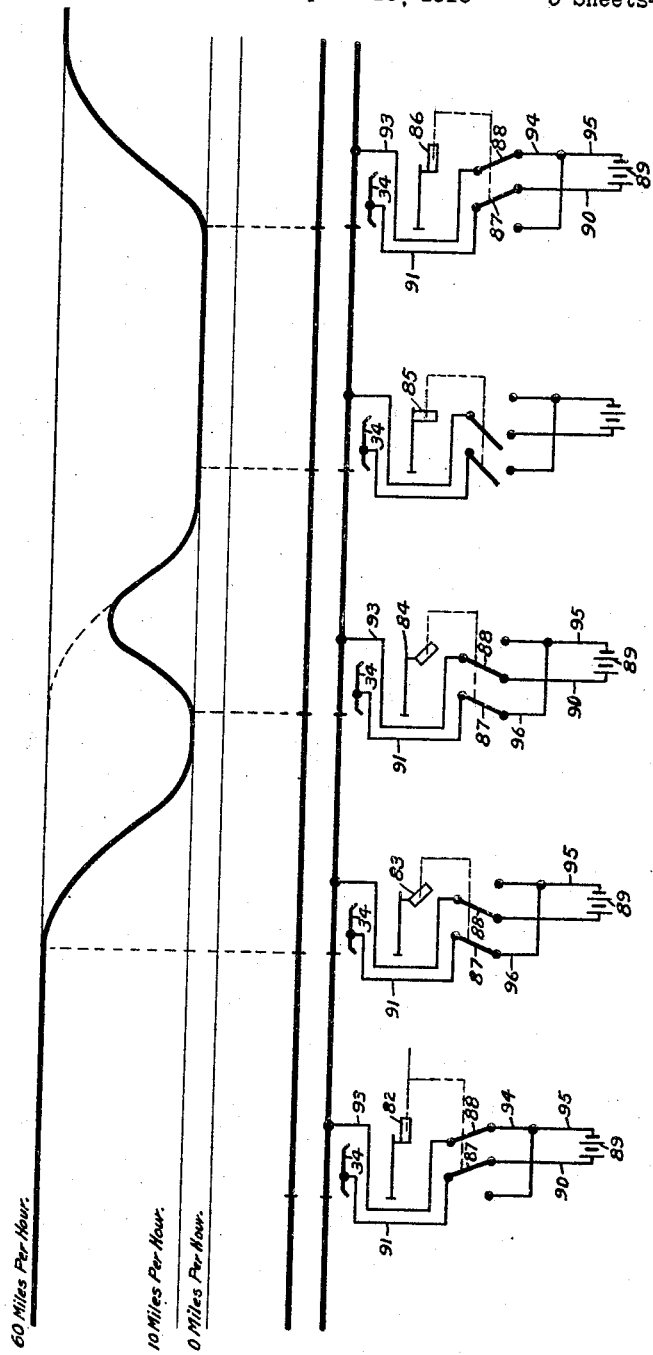

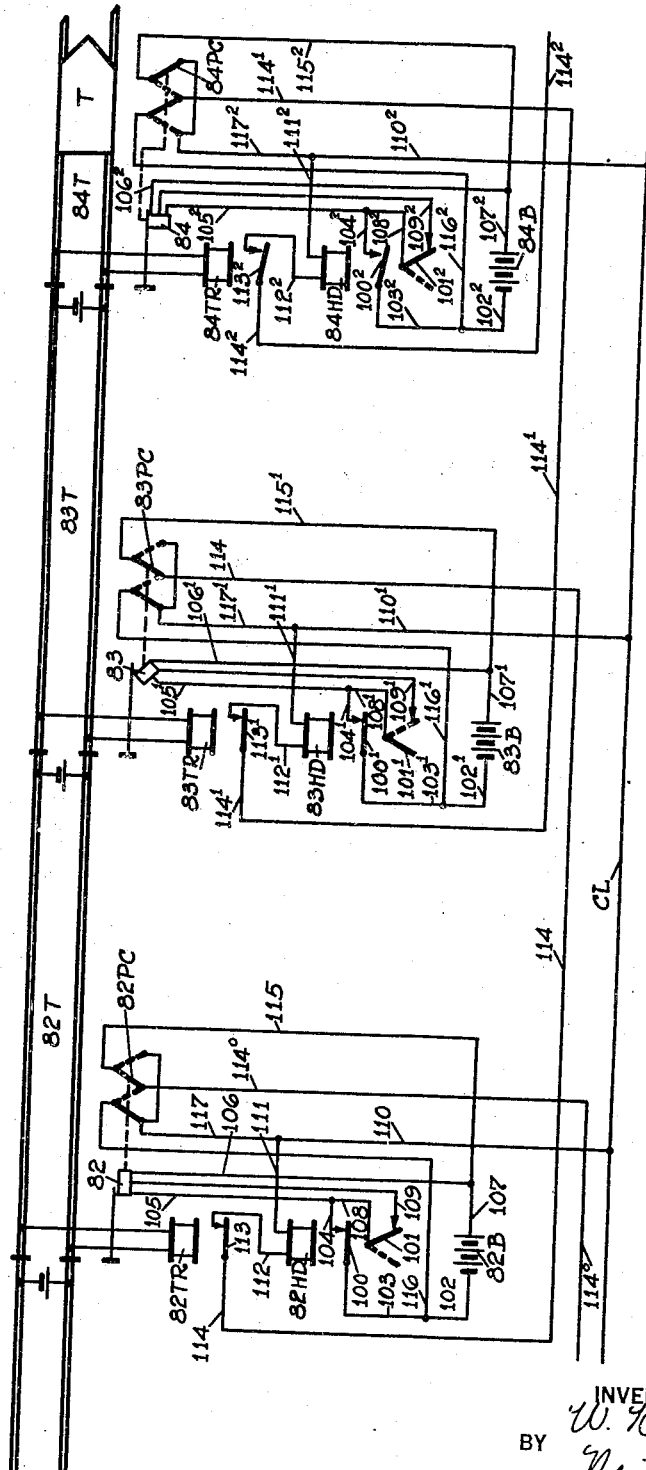

1,824,143

UNITED STATES PATENT OFFICE

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK

AUTOMATIC TRAIN STOP

Application filed April 16, 1913. Serial No. 761,462.

This invention relates to an automatic train controlling device.

The primary object of this invention is to so control a movable vehicle that it will be allowed to move, at all points of the roadway, at the highest possible speed consistent with its safety and the safety of other vehicles upon the same roadway.

A further object of this invention is to so control a movable vehicle that whenever a predetermined permissive speed, varying as the distance traversed varies, is exceeded after passing a signal either at danger or caution position an application of brakes to the wheels thereof will result.

A further object of the invention is to so construct the means for securing the control above mentioned, that the operator of the moving vehicle will have control thereof just so long as he maintains the speed of the vehicle below a certain maximum previously determined for all points along the trackway for the varying conditions under which the movable vehicle may approach the said point.

Other objects and advantages will appear as the description of the invention progresses, and the novel features of the invention will be particularly pointed out in the appended claims.

In describing the invention in detail, reference will be had to the accompanying drawings wherein I have described a preferred physical embodiment of my invention, and wherein like characters of reference designate corresponding parts throughout the several views, and in which:

Figure 1 is a schematic view of my invention. Fig. 2 is a schematic view showing a trackway and the devices located along the trackway for governing the mechanism shown in Fig. 1, together with a speed curve showing the effect of the control exercised by my invention. Fig. 3 shows diagrammatically and conventionally one form of an automatic block signal system for governing the signals shown in Fig. 2.

Referring to Fig. 1, numeral 1, designates one of two rails of a trackway, upon which the wheel 2 fastened to an axle 3, moves. The wheel 2 and axle 3, are considered by me merely as representative of any wheel and axle of a moving vehicle, but preferably of a wheel and axle which is not what is known ordinarily as a driving wheel and axle, or a wheel and axle which at no time has a brake applied thereto for the purpose of retarding the motion of the vehicle which they support. The wheel 2 and axle 3 correctly and accurately exhibit the true rate of motion of the vehicle which they support, never being out of step with the vehicle so to speak, as a driving wheel might be, due to any rotary motion which it might have in excess of that warranted by the forward movement of the vehicle which it supports, caused by an excessive application of power thereto, or as a wheel to which a brake is applied, might be, due to a less rotation than that warranted by the forward movement of the vehicle which it supports, due to the application of a brake thereto to retard its rotative movement.

The axle 3, has a beveled gear 4, rigidly attached thereto which meshes with a beveled gear 5, rigidly attached to the shaft 6, intermediate the ends of which is positioned a worm 7, and on the extreme end of which is positioned a centrifugal device.

The centrifugal device consists of a collar 8 fastened rigidly by means of screw 9, to the shaft 6, and a collar 10 mounted upon shaft 6, so as to slide longitudinally thereon, and two flat springs 11 and 12 acting as connectors between collars 8 and 10, each of which has positioned intermediate its ends the weights 13 and 14 respectively. A rotation of the shaft 6, causes the weights 13 and 14 to move away from the longitudinal axis of the shaft 6, against the tension of springs 11 and 12 and by so doing, to move the collar 10 longitudinally of shaft 6 until it abuts the collar 15 rigidly attached to the shaft 6. The movement of collar 10 longitudinally of shaft 6, is communicated to one arm 16, of a crank pivot at 17 and so causes the other arm 18 of the crank to move in the direction of the arrow $a$, its extreme position being indicated by dotted lines.

19, designates the core of an electromagnet, having a winding 20, one end of which is connected by means of wire 21 to a source of electromotive force 22 herein represented as a battery and having the other end connected by means of wire 23 to contact point 24, which bears against metallic contact plate 25, borne by armature 26, which is pivoted at 27. The metallic plate 25 also has contact point 28 bearing thereagainst, which is connected by means of wire 29 to contact plate 30. Contact plate 30 is normally contacted by a spring held arm 31 of a lever pivoted at 32, which has another arm 33 extending downwardly so as to lie in such a position that it will be contacted by and raised by ramps 34, positioned along the trackway, as best shown in Fig. 2. The angle lever, having arms 31 and 33, is connected by means of wire 35 to a terminal of battery 22.

The pivoted armature 26 has a lug 36 attached thereto against which a lug 37, borne by arm 38, rests, so that arm 38 which is pivoted at 39 to armature 26, is raised to the position as shown in Fig. 1, when the armature 26 is in the position as shown. The arm 38 serves as a journal for shaft 100, to which is rigidly attached the cam 40 and the gear wheel 41. The gear wheel 41 has a weight 42 attached thereto, so that the gear will be moved to the position shown in the drawings, when nothing interferes with the free rotation of the gear 41. The cam 40 contacts with roller 43 journaled on a pin 44, borne by arm 45 which is pivoted at 46 and which, at its outer end, has an arm 47, which by means of pin 48 is pivoted thereto. The arms 45 and 47 have co-operating contacts 49, 50, 51 and 52 insulatingly mounted thereon. Contact is normally made between contacts 49 and 50, but not between contacts 51 and 52, and a movement of arm 47 away from arm 45, first causes contacts 51 and 52 to engage and then after a very slight further separation of arms 45 and 47 has taken place causes contacts 49 and 50 to separate.

Arm 38, at its outer end, lies in proximity to one end of a magnetic core 53 of an electromagnet, which comprises the said core and a coil 54, one end of which by means of wire 55, is connected directly to one terminal of the battery 22, and the other end of which terminates in a contact point 56, which bears against armature 26 when said armature has moved to the extreme right hand position due to an interruption of the flow of current through coil 20.

Normally, current flows from the battery 22 through wire 21, coil 20, wire 23, contact point 24, metallic plate 25, contact point 28, wire 29, contact plate 30, arm 31 in the normal position, and wire 35 to the other terminal of the battery 22. Current flowing in the above traced path causes the armature 26 to be held in the position shown, and consequently, by means of lug 36, bearing against lug 37 of arm 38, holds the arm 38 in the position as shown, and also holds arm 45 in the position as shown. Arm 47 is held in the position as shown by the spring action of the spring contact 49.

If a moving vehicle equipped with applicant's invention should pass a ramp 34, the arm 33 of the lever 32 would contact with the said ramp and be thereby moved to the dotted line position shown in Fig. 1, thereby breaking contact between contact plate 30 and arm 31, thus interrupting the flow of current through the coil 20, consequently allowing armature 26 to move to the right by reason of the weight of the parts attached thereto, and, consequently, allowing gear wheel 41 to mesh with worm 7, and arm 98 to contact wire 99, thus causing bell 80 to ring, informing the operator that the speed of the vehicle should be reduced. The vehicle to which the parts are attached would at that time be in motion; consequently, wheel 2, axle 3, beveled gears 4 and 5, shaft 6 and worm 7 would be in motion and, consequently, gear wheel 41 would immediately be rotated. The rotation of gear wheel 41 would cause cam 40 to rotate and so allow roller 43 and the arm 45, together with arm 47, to move downwardly. If at the time the arm 33 contacted the ramp 34, the vehicle was moving at a high rate of speed, the arm 18 would be in the position illustrated by dotted lines, consequently, a very slight downward movement of arms 45 and 47 would allow arm 47 to contact with the end of arm 18, and so cause contacts 51 and 52 to contact and a short time thereafter cause contacts 49 and 50 to break contact. The engagement of 51 and 52 would allow current to flow in the following path: positive terminal of battery 57, wires 58 and 59, contact 52, contact 51, wire 60, bell 61, and wires 62 and 63 to the negative terminal of the battery 57, thus causing the bell 61 to sound which would be a warning that in a very short space of time 49 and 50 would break contact. The continued rotation of the cam 40 while arm 18 remained in the dotted line position would cause contacts 49 and 50 to break contact, so that the following circuit would be broken: positive terminal of battery 57, wires 58 and 64, contact 50, contact 49, wire 65, electro magnet 66, and wires 67 and 63 to the other terminal of battery 57. The breaking of the above traced normally closed circuit would allow armature 68 to fall, so that spring 69 could open valve 70 in the train pipe 71, so that air could exhaust therefrom and consequently the air brakes upon the moving vehicle would be set. At the same time contact is made between armature 68 and contact point 72, the following circuit would be formed: positive terminal of battery 73, wire 74, recording device 75, wire 76, arm 18, arm 47, wire 77, armature 68, contact point 72, and wire 78 to the negative terminal of the battery 73. The flow of current through the last traced path would, by means of any suitable and appropriate recording device 75 make a record of the fact that the electro magnet 66 had become deenergized and the train pipe vented.

The operation which has just been described is that which would take place when a moving vehicle passed a ramp 34 and did not in any way have its speed diminished. The operator of a moving vehicle having this invention applied thereto, would, however, not allow such an operation to take place, if it were in his power to prevent it, because, the record which will be made against him by recording device 75, will be indisputable evidence that the moving vehicle was automatically stopped, and as it is not intended to have the vehicle automatically stopped unless the operator thereof is unable either through sickness or death to stop it himself, the fact that the recording device 75 has been operated, will mean one demerit mark for him; the moment the moving vehicle passes the ramp 34, the ringing of bell 80 will immediately apprise the operator of the vehicle that unless he properly acts the vehicle will be automatically brought to a stop; and the operator should immediately, either by shutting off the motive power or applying the brakes, cause the vehicle to move at a reduced speed. As soon as the operator causes a reduction in the speed of the vehicle the arm 18 will begin to move downwardly, that is, in a direction opposite to the arrow a. If the operator reduces the speed proportionately to the distance traversed after passing the ramp 34, then, although arm 47 continues to descend, at the same time, the arm 18 by also continuing to descend, will always be out of contact with arm 47; consequently, 51 and 52 will not make contact and bell 61 will not be sounded, electro-magnet 66 will not be deenergized, the train pipe will not be vented, and no record will be made by recording device 75. If the operator does not succeed in reducing the speed of the vehicle to exactly the proper minimum, he will be immediately informed of the fact that by the ringing of bell 61, and if he then acts promptly, he can so reduce the speed of the vehicle, that the arm 18 will quickly move downwardly so that although bell 61 is sounded, 49 and 50 will not break contact and cause a de-energization of electro-magnet 66 with a consequent venting of the train pipe and the making of a record by recording device 75.

The gear wheel 41 will be rotated until worm 7 lies entirely within the cut-out portion 81 of the gear wheel at which time the cam 40 will have been so rotated that arm 45 has reached its very lowest position. Under such condition the arm 47 will be in such a position, that arm 18 may be moved a certain fixed amount above its normal position, so that, the vehicle can continue its movement indefinitely, at say, ten miles per hour, without there being any automatic operation of the brake, that is, when arm 47 is in the very lowest position which it can assume, it will not be contacted by arm 18, when the vehicle is moving at a speed not exceeding ten miles per hour.

In Fig. 2, I have shown a series of signals 82, 83, 84, 85 and 86 opposite each of which is located a ramp 34. Each signal has connected with it, a pole changer consisting of arms 87 and 88 which may be moved to three positions; first, that shown opposite signal 82; second, that shown opposite signal 83; third, that shown opposite signal 85. The pole changer arms 87 and 88 are connected in circuit with a battery 89, one track rail and the ramp located at the signal by which the pole changer is operated through means shown conventionally by a dotted line. When the signal is in the full clear position the pole changer arms are in the position as shown at signal 82, when the signal is in the 45° or caution position, the pole changer arms are in position as shown at signals 83 and 84, and when the signal is in the zero or danger position, the pole changer arms are in the position as shown at signal 85: that is; when the signal is in the full clear position the positive terminal of the battery 89 is connected to the ramp 34; when the signal is in the 45° or caution position, the positive terminal of the battery 89 is connected to a track rail; and when the signal is in the zero or danger position, neither a track rail nor a ramp is connected to either terminal of the battery 89.

These signals 82—86, shown in Fig. 2, may be controlled by any suitable type of automatic block signaling system; and Fig. 3 shows diagrammatically one typical form of automatic block signal system for controlling such three-position signals by polarized line circuits. Referring to Fig. 3, the track rails are divided by insulated joints in the usual well-known manner to provide track-circuited blocks between the signals, these track sections or blocks being designated 82T, 83T, and so on. Connected across the track rails at one end of each of these blocks is the usual track battery, and at the other end the usual track relay, these track relays being designated 82TR, 83TR, so on.

The signals 82—84 shown in Fig. 3 are of the well-known motor-operated semaphore type, such as disclosed, for example, in the patent to W. K. Howe, No. 1,056,992, dated March 25, 1913. The operating motor and the hold-clear device of each of these signals is controlled, so as to move the semaphore to, and hold it in, the 90° or clear position, and the 45° or caution position, by two circuits governed by the contacts of a neutral-polar line relay HD. Referring to the signal 82, when its line relay 82HD is energized with one polarity, closing its neutral front contact 100, and shifting its polar contact 101 to the right, the operating circuit for moving the semaphore to its 45° or caution position is established from one terminal of the battery 82B, wires 102 and 103, neutral contact 100, wires 104 and 105, signal mechanism, and wires 106 and 107 back to the other terminal of said battery. Also, a circuit for moving the semaphore to its 90° or clear position is established from one terminal of the battery 82B, wires 102 and 103, neutral contact 100, wires 104 and 108, polar contact 101, wire 109, signal mechanism and wires 106 and 107 back to the battery. When the line relay HD controlling a signal is energized with the opposite polarity, as shown in the case of the signal 83, its polar contact 101 is shifted to the left, opening the circuit for operating the signal to the clear position, but leaving closed the circuit for operating the signal to the caution position. When the line relay HD is de-energized, opening both its neutral contact 100 and its polar contact 101, both operating circuits for the signal are broken and the semaphore is moved by gravity to its horizontal or stop position. Each of the other signals 83 and 84 is controlled by a line relay 83HD and 84HD by similar operating circuits; and the corresponding contacts and wires are designated by the same reference numbers with distinctive exponents.

Associated with each of these signals 82—84 is a pole-changer 82PC, 83PC, etc. This pole-changer PC is a part of the usual circuit controller of the signal operating mechanism, and is preferably of the snap or quick-acting type, such as disclosed, for example in the patent to W. S. Henry, No. 1,224,542 dated May 1, 1917. These pole-changers PC, as shown conventionally, comprise two contact arms which are operated from one extreme position, shown in connection with the signal 82, to the other extreme position, shown in connection with the signal 84, during the movement of the semaphore between its 45° or caution position and its 0° or stop position.

The line circuit for energizing the line relay 82HD for the signal 82 may be traced from the common line CL, wires 110 and 111, relay 82HD, wire 112, front contact 113 of the track relay 82TR, line wire 114 extending to the signal 83 next in advance, to the pole changer contacts 83PC operated by that signal, wires $115^1$ and $107^1$, battery 83B, wires $102^1$ and $116^1$, pole changer contacts 83PC, and wires $117^1$ and $110^1$, back to the common line CL. The other line relays 83HD and 84HD shown in Fig. 3 are energized by similar line circuits; and the corresponding wires and contacts are designated by the same reference numbers with exponents.

With a train T in the track section or block 84T, as shown in Fig. 3, the track relay 84TR is de-energized, and opens the line circuit for energizing the line relay 84HD for the signal 84, so that this signal assumes its stop position, shifting its pole changer contacts 84PC to reverse the polarity of energization of the line relay 83HD associated with the signal 83 next in the rear, and thereby causing this signal 83 to indicate caution. The signal 82, at the entrance to the second block in the rear of the occupied block, indicates clear.

If a moving vehicle equipped with applicant's device, should pass the ramp 34, located opposite signal 85 in Fig. 2, the operation which has just been described would take place, but if a moving vehicle similarly equipped, should pass ramp 34 opposite signal 82, the armature 26 would not be released, and consequently, the operations which have been described would not take place, because, when the arm 33 contacts with such a ramp, although connection between contact plate 30 and arm 31 is broken, another path by which current could flow through the coil 20 and so magnetize core 19, would be formed as follows: positive terminal of battery 89, wire 90, pole changer arm 87, wire 91, ramp 34, arm 33, wire 35, battery 22, wire 21, coil 20, wires 23 and 92 to some ground on the moving vehicle, as to the wheel 2, the rail, wire 93, pole changer arm 88 and wires 94 and 95 to the other terminal of the battery 89. It should be noted that this circuit contains two batteries, 22 and 89, connected in series.

If a moving vehicle equipped with applicant's device should pass a signal such as 83 in the caution position, the arm 33 would contact with ramp 34, and, consequently, connection between plate 30 and arm 31 would be broken, thereby interrupting the flow of current from battery 22 through the coil 20. The position of the pole changer arms 87 and 88, governed by signal 83, would of course, allow current to flow from battery 89 at signal 83 to a rail, thence to the wheel 2, and wires 92 and 23, coil 20, wire 21, battery 22, wire 35, arm 33, ramp 34, wire 91, pole changer arm 87 at signal 83, and wires 96 and 95 to the other terminal of the battery 89. Although the circuit last traced is a complete one, and batteries are included therein, it will be seen that the batteries are in opposition, and consequently, no effective current will flow to energize the coil 20 to hold the armature 26 in the position in which it is now shown in Fig. 1; consequently, the armature 26 will move to the right and allow the operation heretofore described to take place.

In connection with Fig. 2, applicant has shown a heavy black line, which by its vertical distance from the light line, designated 0 miles per hour, indicates the rate of speed at which a vehicle traveling upon the trackway is moving. It will be noted that the line dips quite sharply downward at the point at which signal 83 is placed. The curve between the point at which signal 83 is situated and the point at which signal 84 is situated exhibits diagrammatically the reduction in speed of the moving vehicle which should be caused by the operator thereof. If such reduction in speed is made by the operator, applicant's invention will not act to automatically apply the air brakes of the moving vehicle, but if the operator of the moving vehicle allows the speed of the moving vehicle at any point between signals 83 and 84 to be greater than that represented by the curve, opposite the particular point, then an automatic operation of the air brakes will take place and the train will be brought to a standstill independently of the operator.

The reduction in speed necessitated whenever the vehicle passes a caution signal will then result in causing the moving vehicle to approach the next signal in advance at a very low rate of speed which for the purposes of illustration has been considered to be ten miles per hour. If the signal 84 then happens to be in the caution position, a flow of current will take place from battery 89 through coil 54, in the following circuit: positive terminal of battery 89, wire 90, pole changer arm 88, wire 93, to the rail, then to wheel 2 and wire 97, armature 26, contact point 56, coil 54, wires 55 and 35, arm 33, ramp 34, wire 91, pole changer arm 87, and wires 96 and 95 to the other terminal of the battery 89. Current flowing in the above traced path would raise arm 38, although armature 26 would still be in the right hand position, so that gear wheel 41 would be rotated to the position as shown in the figure by virtue of the weight 42 attached thereto, and, consequently, the arms 45 and 47 would be raised to the position as shown in Fig. 1. As soon, however, as the arm 33 passed off from ramp 34, the circuit through coil 54 would be broken, and consequently, the arm 38 would again drop, allowing gear wheel 41 to mesh with worm wheel 7, so that the same operation could take place as took place when the moving vehicle passed ramp 34 at signal 83. The impulse having been transmitted to the moving vehicle, the coil 54 energized, and the gear wheel 41 turned to normal position, would make possible a speed of sixty miles per hour by the moving vehicle, but, of course, it would be impossible to instantly attain such speed; therefore, the speed curve would rise at a rate governed by the accelerating power of the moving vehicle, but after having attained a certain speed governed by the distance from signal 84 traversed by it, it would be necessary for the vehicle to again reduce speed just exactly as was done between signals 83 and 84 so that the speed curve would be somewhat like that represented between signals 84 and 85.

The moving vehicle would approach signal 85 at a speed of say ten miles per hour and if signal 85 were in the zero or full danger position, no circuit would be formed from the battery 89 through either of the coils 20 or 54, and, consequently, arm 47 would remain in its lower position necessitating a speed of the moving vehicle, not exceeding ten miles per hour throughout the block between signals 85 and 86.

When a moving vehicle equipped with applicant's invention passes ramp 34, at signal 86, a circuit will be formed as follows: positive terminal of battery 89, wire 90, pole changer arm 87, wire 91, ramp 34, arm 33, wire 35, battery 22, wire 21, coil 20, wires 23 and 92, wheel 2, the rail, wire 93, pole changer arm 88 and wires 94 and 95 to the negative terminal of the battery 89. Current flowing in the above traced path magnetizes core 19 and so causes armature 26 to be drawn to the left into the position as shown in Fig. 1, thereby restoring gear wheel 41, cam 40, and arms 45 and 47, to the position as shown in Fig. 1, so that the operator of the moving vehicle may immediately allow the speed of the same to increase to the maximum of sixty miles per hour.

When a moving vehicle equipped with applicant's invention passes a ramp located at a signal as 83, which is in the caution position, the contact of shoe 33 with ramp 34 places battery 89 in a circuit in opposition to battery 22 and so causes, in the manner heretofore described, the armature 26 to move into contact with contact 56, so that a circuit would be formed through coil 54 so as to raise arm 38 but this circuit will be immediately broken as soon as the arm 33 moves out of contact with ramp 34, so that no result different from that described will take place.

From the foregoing description taken in connection with the drawings, it will be seen applicant has provided a device whereby a moving vehicle may continue upon a trackway at a maximum speed, just so long as the signals governing the movement of the moving vehicle are in a full clear position; that the passing of a signal in the caution position will set a train of mechanism into operation which will cause the moving vehicle to be automatically brought to a standstill at any point between the caution signal which has been passed and the succeeding signal, if the moving vehicle progresses at any speed greater than a speed which is above that at which the moving vehicle should be moving at any particular point; that the passing of a second caution signal after having passed one caution signal, will so act upon the train mechanism that the speed of the moving vehicle may be increased up to a speed governed by the distance beyond the second caution signal and the speed at which the moving vehicle is traveling at that point and that thereafter the speed of the moving vehicle must be reduced just exactly as it had to be reduced when the moving vehicle passed the first caution signal; that the passage of a moving vehicle by a danger signal after the passage of the moving vehicle by a caution signal will necessitate a continued movement of the moving vehicle at the same speed at which it was necessary to approach the danger signal.

The principle underlying the invention consists, therefore, in regulating the speed of a moving vehicle in a predetermined manner governed both by the distance passed over by the moving vehicle and the rate of speed of the moving vehicle after it has passed over that distance, that is, successive increments of distance will necessitate successive decrements of speed.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In an automatic train stop: a trackway; a vehicle having wheels for movement upon the trackway; an electro-magnet on the vehicle; a source of current on the vehicle; a movable contact shoe, having a normal position and a reverse position and biased to the normal position, carried by the vehicle; a circuit controller governed by the contact shoe, said circuit controller being closed by the contact shoe in normal position and opened when the contact shoe is in reverse position; a movable armature pulled toward the electro-magnet when the electro-magnet is energized and moved away from the electro-magnet by gravity; a circuit controller governed by the armature, said circuit controller being open when the armature has been moved by gravity and closed when the armature has been moved by the electro-magnet; the source of current, the circuit controller governed by the contact shoe, the circuit controller governed by the armature and the electro-magnet included in a normally closed circuit; a worm connected to and driven by a wheel of the vehicle; a pivoted cam member formed with teeth and supported by the armature out of contact with the worm when the armature is pulled by the electro-magnet but allowed to engage the worm when the armature is moved by gravity; a pivoted member supported by the cam member, said pivoted member being allowed to gradually fall by a revolution of the cam produced by the worm; a circuit controlling member supported by said pivoted member so as to fall therewith when the pivoted member is allowed to fall by the revolution of the cam; two circuit controllers governed jointly by the pivoted member and the circuit controlling member, one of said circuit controllers being normally open and the other normally closed, a movement of the circuit controlling member away from the pivoted member causing the normally open contact to close and the normally closed contact to open; means for braking the vehicle, said means governed by the normally closed circuit controller governed jointly by the circuit controlling member and the pivoted member; an alarm device controlled by the normally open circuit controller controlled jointly by the circuit controlling member and the pivoted member; a speed arm moved in accordance with the speed of the vehicle, said speed arm lying in the path of the circuit controlling member in its downward movement so as to contact therewith if the speed of the vehicle is above a certain value, the contact of the speed arm and the circuit controlling member causing the circuit controlling member to move away from the pivoted member; and a ramp located on the trackway in the path of the contact shoe for moving the shoe to reverse position.

2. In an automatic train stop: a vehicle; a speed arm moved in correspondence with the speed of the vehicle; a movable member moved in the path of the speed arm in correspondence with the distance traveled by the vehicle; a support for said movable member, said support and movable member being movable away from each other by a continuous relative movement of the speed arm and the movable member after contact with each other; vehicle braking means; and means governed jointly by the support and the movable member for governing the vehicle braking means.

3. In a system for automatically controlling the speed of railway vehicles, in combination: a movable member which assumes different positions in accordance with a predetermined permissive speed of the vehicle; another movable member which assumes different positions in accordance with the actual speed of said vehicle; a warning signal; mechanism for controlling the speed of said vehicle; and means operated by a predetermined cooperation of said two movable members for actuating said warning signal and said mechanism successively after an interval.

4. In a system for automatically controlling the speed of railway vehicles, in combination: a vehicle; a speed arm which is moved in accordance with the speed of the vehicle; a distance arm which is moved in accordance with the distance traveled by the vehicle; a member mounted on said distance arm in the path of movement of said speed arm, said member being movable relatively to said distance arm by a continuous relative movement of said speed arm and said distance arm after contact with each other; a warning signal; means for braking said vehicle; means set into operation by a certain relative movement of said movable member and said distance arm for controlling said warning signal; and means set into operation by a further relative movement of said movable member and said distance arm for controlling said vehicle braking means.

5. In a system for automatically controlling the speed of railway vehicles, in combination: a vehicle; a speed arm mounted on said vehicle and moved in accordance with the speed of said vehicle; a movable member on said vehicle which is moved in accordance with the distance traveled by the vehicle; an auxiliary member movably supported in the path of said speed arm on said movable member, said auxiliary member and said movable member being movable from each other by a continuous relative movement of said speed arm and said movable member after contact with each other; vehicle braking means; means governed jointly by said movable member and said auxiliary member for governing said vehicle braking means; and means for recording the operations of said vehicle braking means.

6. In a system for automatically controlling the speed of railway vehicles, in combination: a movable member which assumes different positions in accordance with a predetermined permissive speed for said vehicle; a second member which assumes different positions in accordance with the actual speed of said vehicle; a normally energized brake control device; means operated by a predetermined cooperation of said two movable members for de-energizing said brake control device to cause an automatic brake application; a recorder; and means for operating said recorder upon de-energization of said brake control device provided said movable members have cooperated and caused such de-energization.

7. In a system for automatically regulating the speed of railway vehicles, brake control apparatus including a speed-responsive device driven from the wheels of the vehicle and acting to apply the brakes of the vehicle when its speed is excessive; a warning signal on the vehicle, and automatic means associated with said device for actuating said warning signal dependent upon the speed of the vehicle a limited time before the brakes are actually applied.

8. In a system for automatically controlling the speed of railway vehicles, in combination: an automatic speed control apparatus carried on a vehicle; mechanism controlled by said speed control apparatus for governing the movement of said vehicle; a caution signal; a warning signal; said caution signal being controlled by said speed control apparatus and being actuated when said apparatus is set into operation; and means for actuating said warning signal at a predetermined interval before said vehicle governing mechanism is set into operation.

9. In a system for automatically controlling the speed of railway vehicles, in combination: a movable member which assumes different positions in accordance with predetermined speed limits for the vehicle; another movable member which assumes different positions in accordance with the actual speed of said vehicle; a warning signal; mechanism for controlling the speed of said vehicle; means operated by a predetermined cooperation of said two movable members for actuating said warning signal and said mechanism successively after an interval; and means for recording the operations of said mechanism.

10. In a system for automatically controlling the speed of railway vehicles, in combination: an automatic vehicle controlling apparatus responsive jointly to the actual speed of the vehicle and the distance traveled by said vehicle after said control apparatus is set into operation; brake control means governed by said apparatus for controlling the movement of said vehicle; and recording means having its operation dependent upon the operation of said vehicle controlling apparatus and also the operation of said brake control means.

11. In a system for automatically controlling the speed of railway vehicles, in combination: a movable member which assumes different positions in accordance with the actual speed of the vehicle; a second movable member; means for connecting and disconnecting said second movable member to and from the wheels of the vehicle, whereby said second movable member is moved in accordance with the distance traveled by the vehicle; an electromagnet for moving said means to its disconnecting position, a normally closed circuit for said electromagnet including a source of current of a certain polarity, said circuit being broken when said means is in its connecting position; another electromagnet for moving said means to its disconnecting position; a partial circuit for said second electromagnet, one break in said partial circuit being closed when said means is in its connecting position; cooperatve devices carried by the vehicle and located along the trackway for selectively applying current of different polarities across the break in said circuit for said first mentioned electromagnet and across the terminals of the partial circuit for said second electromagnet; and means governed by a predetermined cooperation of said two members for controlling the movement of said vehicle.

12. In a system for automatically controlling the speed of railway vehicles, in combination: a movable member which assumes different positions in accordance with the actual speed of the vehicle; a second movable member which assumes different positions in accordance with a predetermined permissive speed for said vehicle; an arm carried by said second movable member and arranged to cooperate with said first movable member; two circuit controlling devices governed by the movement of said arm relative to said second movable member; one of said circuit controlling devices being closed by a certain relative movement of said arm and said second movable member, and the other circuit controlling device being opened by a similar relative movement continued in the same direction; a warning signal operated by said first mentioned circuit controlling device; and means for governing the movement of the vehicle operated by said second mentioned circuit controlling device.

13. In a system for automatically controlling the speed of railway vehicles, in combination: automatic apparatus for controlling the movement of said vehicle; an electromagnet for governing said apparatus; a battery carried by the vehicle; a normally closed controlling circuit including said battery and said electro-magnet; a contact shoe carried by said vehicle and having a normal position and an operated position; said shoe in its operated position interrupting said normally closed circuit; a partial circuit for said electro-magnet including said battery and terminating at said shoe and at the wheels of said vehicle; ramps arranged along the trackway for the vehicle and adapted to cooperate with said shoe; and means associated with each of said ramps for creating different potential differences between that ramp and a track rail.

14. In a system for automatically controlling the speed of railway vehicles, in combination: a trackway divided into electrically isolated blocks; a source of current and a relay associated with each block and constituting a normally closed track circuit; an automatic speed control apparatus carried by said vehicle; an electro-magnet for governing said apparatus; a battery carried by said vehicle; a normally closed circuit including said battery and said electro-magnet; a contact shoe carried by said vehicle and having a normal position and an operated position; a circuit controlling device controlled by said shoe and interrupting said normally closed circuit when said shoe is in its operated position; a partial circuit for said electro-magnet including said battery and terminating at said shoe and at the wheels of said vehicle; ramps arranged along said trackway at the entrance to each block to cooperate with said shoe; a source of electric current associated with each ramp; a second partial circuit including said source of current, said ramp and a track rail; and a pole changing device interposed in said second partial circuit, said pole changing device being controlled by the track circuits of certain of said blocks succeeding the corresponding ramp.

15. In a system for automatically controlling the speed of railway vehicles, in combination: an automatic speed control apparatus carried by a vehicle and responsive to potential differences of different polarities and including means responsive to the speed of the vehicle, a partial controlling circuit for said apparatus; a contact shoe carried by said vehicle; said controlling circuit terminating at said contact shoe and at the wheels of said vehicle; insulated ramps located along the trackway for said vehicle and arranged to cooperate with said shoe; and means for creating potential differences of different polarities between each ramp and the track rails.

16. In a system for automatically controlling the speed of railway vehicles, in combination: a movable member which assumes different positions in accordance with the actual speed of said vehicle; a second movable member; a cam for governing the movement of said second movable member; means for operatively connecting and disconnecting said cam to and from the wheels of said vehicle; an electro-magnet for actuating said means to its disconnecting position; a second electro-magnet for actuating said means to its disconnecting position; a normally closed circuit for said first electro-magnet which is broken when said means is in its connecting position; a normally open partial circuit for said second electro-magnet, one break in said last mentioned partial circuit being closed when said means is in its connecting position; cooperating devices carried by the vehicle and located along the trackway for breaking said normally closed circuit and for selectively applying energizing current to said normally closed circuit and to said partial circuit; and means responsive to a predetermined cooperation of said two movable elements for controlling the movement of said vehicle.

17. In a system for automatically controlling the brakes of railway vehicles, a speed-responsive device driven from the wheels of the vehicle, a permissive speed element changeable to prescribe predetermined limiting speeds for the vehicle, traffic controlled means for operatively connecting said element to the wheels of the vehicle and cause it to change in accordance with the progress of the vehicle, an audible signal indicating when said element is thus operatively connected to the vehicle wheels, and brake control means controlled jointly by said speed-responsive device and said permissive speed element and actuated whenever the actual running speed of the vehicle exceeds the speed limit prescribed by said element.

18. In a system for automatically controlling railway vehicles, a speed-responsive device driven from the wheels of the vehicle, a changeable permissive speed element for establishing different permissible speed limits for the vehicle, gearing operable to establish a driving connection between said element and the wheels of the vehicle and biased to assume such driving connection, two electro-magnets each operable when energized to actuate said gearing to disengage said element from the wheels of the vehicle, one of said electro-magnets controlling the energizing circuit for the other, and cooperating means on the vehicle and along the trackway for selectively governing the energization of said two electro-magnets.

19. In a system for automatically controlling the speed of railway vehicles, in combination: a movable member which assumes different positions in accordance with the actual speed of a vehicle; a rotary cam arranged to be operatively connected to the wheels of said vehicle and thereby to be rotated in accordance with the travel of said vehicle, the radii of said cam varying according to a predetermined functional relation between a permissive speed for said vehicle and the distance traveled by said vehicle; brake control means responsive to the joint action of said movable member and said cam; a track battery; a ramp; traffic controlled means for connecting said battery between said ramp and the track rails to apply potentials of different polarity to the ramp and for disconnecting said battery from the ramp; and electro-responsive means on the vehicle responsive to the polarity of the energization and also the de-energization of said ramp for automatically controlling the operating connection between said cam and the vehicle wheels.

20. In a system for automatically controlling the speed of railway vehicles, in combination: a trackway divided into electrically isolated blocks; a source of current and a relay associated with each block and constituting a normally closed track circuit; an insulated ramp associated with each block; a source of current and control circuits associated with each ramp and controlled by the track circuits of a certain number of blocks succeeding said ramp for creating different potential differences between that ramp and the contact rails; automatic vehicle controlling mechanism carried by said vehicle and having a cycle of operation; a contact shoe carried by said vehicle and arranged to cooperate with said ramps; means for commencing said cycle of operation of said mechanism; means for restoring said mechanism to its normal or initial position; and partial controlling circuits for said two means terminating at said contact shoe and at the wheels of said vehicle, said two means being selectively responsive to said different potential differences.

21. In a system for automatically controlling vehicles, in combination; an automatic vehicle controlling mechanism having a cycle of operation; means for commencing said cycle of operation of said mechanism; means for restoring said mechanism to its normal or initial position; and cooperating devices carried by the vehicle and located along the trackway for selectively governing both of said means.

22. The combination with a vehicle, of an electrically controlled signal, electrically controlled traffic controlling means, circuits for said signal and means, circuit controllers for the circuits including sets of relatively movable coacting elements, a device operating in accordance with the speed of the vehicle, to relatively move the first elements of each circuit controller with respect to the others to control said circuits, and a permissible speed determining means arranged to move the other elements of both circuit controllers with respect to the first mentioned elements to also control the circuits.

23. The combination with a vehicle, of an electrically controlled signal, electrically controlled traffic controlling means, circuits for said signal and means, relatively movable supports, a circuit controller for each circuit including contact elements respectively mounted on the supports, a device operating in accordance with the speed of the vehicle for moving one of the supports, and a permissible speed determining means for moving the other support.

24. In an automatic train stop; a vehicle; an element moved in correspondence with the speed of the vehicle; a movable member moved in the path of the element in correspondence with the distance traveled by the vehicle; a support for said movable member, said support and movable member being movable away from each other by a continuous movement of the element and the movable member after contact with each other; vehicle braking means; and means governed jointly by the support and the movable member for governing the vehicle braking means.

25. In a system for automatically controlling the speed of railway vehicles, in combination: a vehicle; an element which is moved in accordance with the speed of the vehicle, a distance arm which is moved in accordance with the distance traveled by the vehicle; a member mounted on said distance arm in the path of movement of said element, said member being movable relatively to said distance arm by a continuous relative movement of said element and said distance arm after contact with each other; a warning signal; means for braking said vehicle; means set into operation by a certain relative movement of said movable member and said distance arm for controlling said warning signal; and means set into operation by a further relative movement of said movable member and said distance arm for controlling said vehicle braking means.

26. In a system for automatically controlling the speed of railway vehicles, in combination: an automatic speed control apparatus carried on a vehicle; mechanism controlled by said speed control apparatus for governing the movement of said vehicle; a caution signal; a warning signal; said caution signal being controlled by said speed control apparatus and being actuated when said apparatus is set into operation; and means for actuating said warning signal at a predetermined interval before said vehicle governing mechanism is set into operation.

27. In combination, a railway vehicle, vehicle governing means thereon, slow-acting means for controlling said governing means, means responsive to the speed of the vehicle and its progress along the track for setting said slow-acting means into operation, and a signaling device for indicating when said slow-acting means has been set into operation.

28. In combination, a railway vehicle, means on the vehicle adapted to change progressively towards an ultimate condition, automatic traffic controlled devices located in the trackway for causing said means to be restored away from said ultimate condition under safe traffic conditions and for releasing said means to permit its change toward its ultimate condition under unsafe traffic conditions, and a warning signal and a normally inactive vehicle-stopping device on the vehicle controlled successively by said means.

29. The combination with a vehicle, of an electrically controlled normally inactive signal, electrically controlled traffic controlling means, circuits for said signal and means, circuit controllers for the circuits, and means mounted partly outside the vehicle and partly on the same for successively operating the circuit controllers, said means including a device operating in accordance with the speed of the vehicle to first set the signal in operation and afterwards actuate the traffic controlling means.

30. The combination with a vehicle, of an electrically controlled normally inactive signal, electrically controlled traffic controlling means, circuits for said signal and means, circuit controllers for the respective circuits, and means mounted partly outside the vehicle and partly upon the same and including a permissible speed device for successively operating the circuit controllers to first set the signal in operation and afterwards the traffic controlling means.

31. The combination with a vehicle, of an electrically controlled signal, electrically controlled normally inactive traffic controlling means, circuits for said signal and means, circuit controllers for the circuits, and a device operating in accordance with the speed of the vehicle for successively operating the circuit controllers to first set the signal in operation and afterwards actuate the traffic controlling means.

32. The combination with a vehicle, of an electrically controlled signal, electrically controlled normally inactive traffic controlling means, circuits for said signal and means, circuit controllers for the circuits, and a permissible speed device for successively operating the circuit controllers to first set the signal in operation and afterwards actuate the traffic controlling means.

33. Speed controlling apparatus for railway vehicles, comprising means on a vehicle adapted to vary in accordance with the permissive speed of the vehicle, speed-responsive means on the vehicle and controlled by the actual speed of the vehicle, a signal and a speed controlling mechanism on the vehicle, said first two means coacting to cause actuation of said signal when the actual speed exceeds the permissive speed by a small value, and said two means coacting to cause actuation of said speed controlling mechanism when the actual speed exceeds the permissive speed by a greater value.

34. Speed controlling apparatus for railway vehicles comprising means on a vehicle adapted to vary in accordance with the permissive speed of the vehicle, speed-responsive means on the vehicle and controlled by the actual speed of the vehicle, a signal and a speed controlling mechanism on the vehicle, said first two means coacting to cause actuation of said signal at a predetermined permissive speed for a given actual speed, and to cause actuation of said speed-controlling mechanism at a lower permissive speed for said given actual speed.

35. Speed controlling apparatus for railway vehicle comprising means on a vehicle adapted to vary in accordance with the permissive speed of the vehicle, speed-responsive means on the vehicle and controlled by the actual speed of the vehicle, a signal and a speed controlling mechanism on the vehicle, said first two means coacting to cause actuation of said signal at a predetermined actual speed for a given permissive speed, and to cause actuation of said speed controlling mechanism at a higher actual speed for said given permissive speed.

36. In combination, a railway vehicle, vehicle governing means thereon, slow-acting means for controlling said governing means, a device on the vehicle adapted to vary progessively towards an ultimate condition, means responsive to said device and to the speed of the vehicle for setting said slow-acting means into operation, and a signaling device for indicating when said slow-acting means has been set into operation.

37. Automatic speed control apparatus for railway vehicles comprising permissive speed means including an element moved to different positions, a member movably connected to said element, a pair of normally open contacts carried by said element and member respectively and closed by their relative movement, a pair of normally closed contacts carried by said element and member respectively and opened after a further relative movement thereof, a warning signal and a circuit therefor including said normally open contacts, a brake-setting device, a circuit for controlling said device including said normally closed contacts, and a speed responsive device connected to the wheels of the vehicle and having a part adapted to engage said member.

38. Automatic speed control apparatus for railway vehicles comprising a permissive speed member, an arm pivotally connected to said member, pairs of normally open and normally closed contacts carried by said member and arm respectively, said pairs of contacts being closed and opened respectively by different relative movements of said member and arm, a warning signal controlled by the normally open contacts, a brake-setting device controlled by the normally closed contacts, and means responsive to the actual speed of the vehicle for causing movement of said arm relative to said member.

39. Automatic speed control apparatus for railway vehicles comprising two relatively movable members, pairs of contacts carried by said members and actuated by different degrees of relative movement thereof, a warning signal and a brake-setting device controlled separately by said contacts, and speed control means for causing gradual relative movement of said members when the speed of the vehicle is excessive.

40. In an automatic train control system for railroads divided into blocks, a contact rail near the entrance to each block, trackway means for impressing current of one or the other polarity or no current on each contact rail depending upon which block ahead is occupied, a contact shoe on the vehicle adapted to cooperate with said contact rails, and automatic speed control apparatus on a vehicle including a speed responsive device connected to the wheels thereof and adapted to respond to the polarity or absence of current for governing the speed of said vehicle.

41. In an automatic train control system for railroads divided into blocks, a contact rail near the entrance to each block, trackway means for impressing current of one or the other polarity or no current on each contact rail depending upon which block ahead is occupied, a contact shoe on the vehicle adapted to cooperate with said contact rails, normally closed contacts opened by the engagement of said shoe and the contact rail, automatic speed control apparatus on a vehicle including a speed responsive device connected to the wheels thereof, and a normally closed circuit including said shoe contacts for normally maintaining said apparatus in its maximum speed condition, said apparatus being responsive to the polarity or absence of current supplied thereto.

42. In an automatic train control system, vehicle carried apparatus comprising an automatic brake setting appliance thereon for governing the brakes of the vehicle, a normally closed circuit for energizing said appliance, a warning signal, a normally open circuit for energizing said warning signal to cause operation thereof, cooperable members actuated respectively in accordance with the actual speed and the permissible speed of the vehicle for closing said open circuit and thereafter opening said closed circuit within a limited interval of delay, and recording means having its operation dependent upon the actuation of said brake setting appliance and also the cooperation of said members.

43. In an automatic train control system for railroads having tracks divided into blocks, the combination with vehicle-carried apparatus comprising, a normally inactive electrically operable signal arranged to attract the attention of the operator of the vehicle whenever rendered active, a normally open circuit including said signal and acting if closed to render it active, automatic brake applying means including a normally energized electro-pneumatic valve and adapted upon deenergization of said valve to act upon the regular air-brake equipment of the vehicle and produce an automatic application of the brakes, a normally closed circuit for energizing said electro-pneumatic valve, and an electrically operable recorder automatically actuated upon deenergization of said valve, of means on the vehicle controlled by means on the track and acting in each block if the next block in advance is occupied and if the vehicle exceeds a predetermined speed limit at a selected point in said block to close first said normally open circuit and thereafter open said normally closed circuit with an intervening interval of delay.

44. In an automatic train control system for railroads, the combination with car-carried apparatus comprising, a normally inactive electrically operable warning signal, a normally open circuit for rendering said warning signal active upon closure thereof, automatic brake-setting means normally energized electrically and acting upon de-energization thereof to cause an automatic application of the air-brakes, a normally closed circuit for energizing said brake-setting means, an electrically operable recorder automatically actuated upon de-energization of said brake-setting means, control means including a movable member and operating to move said member gradually through a certain distance for first closing said normally open circuit operating the warning signal and thereafter opening said normally closed circuit energizing the brake applying means with an intervening interval of delay, and of means partly on the vehicle and partly on the track for initiating operation of said control means at a predetermined point on the track under dangerous traffic conditions.

45. In an automatic train control system for railroads having tracks divided into blocks, apparatus on a vehicle comprising, an electrically operable warning signal arranged to attract the attention of the operator on the vehicle when operated, an electrically operable recorder, a normally open circuit for operating said warning signal, a normally open circuit acting when closed to conduct current through said recorder and cause operation thereof, separate normally open circuit controlling devices included in said circuits, and means controlled from the trackway at a predetermined point in each block and having its operation dependent upon the speed of the vehicle for closing the circuit controlling device in the recorder operating circuit during the progress of the vehicle through the block if the speed is excessive and only after closure of the warning signal operating circuit, whereby the warning signal is operated prior to the recorder and aids the engineer so warned to avoid operation of the recorder.

46. In an automatic train control system, the combination with a vehicle, of automatic train control apparatus therefor, comprising a warning signal actuated prior to an automatic application of the brakes, an electrically operable recorder, a normally open circuit passing through said recorder for actuating it, and normally open contacts included in said circuit and closed when said warning signal is operated.

47. In a system for automatically protecting traffic on railroad tracks, the combination with automatic mechanism for controlling the movement of a vehicle comprising speed responsive means having its controlling condition governed by the actual speed of the vehicle, of a permissive speed means capable of having its controlling condition regulated by the varying polarity of electrical energy supplied thereto, and means governed jointly by said speed responsive means and said permissive speed means for retarding the movement of the vehicle whenever the actual speed exceeds the prescribed permissive speed.

48. In a system for automatically protecting traffic on railroad tracks, the combination with automatic mechanism for controlling the movement of a vehicle comprising speed responsive means having its controlling condition governed by the actual speed of the vehicle, of a permissive speed means capable of having its controlling condition regulated by the varying polarity of electrical energy supplied thereto, and means governed jointly by said speed responsive means and said permissive speed means for retarding the movement of the vehicle whenever the actual speed exceeds the prescribed permissive speed and signals on the vehicle operated to show the regulation of the controlling condition of the permissive speed means effected.

49. In an automatic train control system for railroads having tracks divided into blocks, a ramp near the entrance to each block, automatic trackway means responsive to the presence of trains in the said blocks for impressing a potential of one polarity on said ramp with respect to the track rails if the corresponding block and also the next block in advance are both not occupied, a potential of opposite polarity if the corresponding block is not occupied but the next block in advance is occupied, and for de-energizing said ramp if the corresponding block is occupied; a shoe on the vehicle cooperating with said ramp; electro-responsive means on the vehicle responding to the polarity of the energization and also the de-energization of said ramp; and automatic brake control apparatus on the vehicle including a speed-responsive device driven from the wheels of the vehicle, and governed by said electro-responsive means differently according to the polarity of energization and the de-energization of said ramp, for establishing different speed limits dependent upon block occupancy and for automatically applying the brakes of the vehicle if it exceeds the speed limit established.

50. In an automatic train control system for railroads having tracks divided into blocks, the combination with automatic brake control apparatus on a vehicle adapted when in its active controlling condition to apply the brakes of the vehicle if it exceeds a predetermined speed, said apparatus when once in such active controlling condition remaining in that condition until restored, of trackway means effective to restore said apparatus to its inactive condition near the entrance to each clear and caution block and to render said apparatus active at the entrance to a caution and danger block.

51. In an automatic train control system for railroads having tracks divided into blocks each equipped with a track circuit, the combination with automatic brake control apparatus on a vehicle for governing the brakes thereof dependent upon its running speed, said apparatus being changeable from an initial condition and remaining in its changed condition until restored automatically from the trackway, of trackway means effective to restore said apparatus to its initial condition near the entrance to each clear and caution block and to cause said apparatus to assume its changed condition immediately thereafter if the block in question should happen to be a caution block.

52. In a train control system for automatically governing the brakes of a railway vehicle in accordance with traffic conditions and their running speed, the combination with a railroad track divided into blocks each equipped with a track circuit, automatic brake control apparatus on a vehicle including a speed responsive device operating in accordance with the running speed of the vehicle, said apparatus having an initial condition and a changed condition and remaining in its changed condition until automatically restored from the trackway, and means on the trackway associated with each block and governed by the track circuits of that block and the next block in advance for restoring said apparatus to its initial condition if such block is a clear or caution block and for thereafter causing said apparatus to assume its changed condition if such block was a caution block.

53. An automatic train speed control system for railroads having a track divided into blocks comprising, automatic brake control apparatus on a vehicle including a speed responsive device driven from the wheels of the vehicle, said apparatus having an initial condition and a changed condition in which different continuing speed limits are set up which the vehicle cannot exceed without an automatic application of the brakes, said apparatus remaining in its changed condition until automatically restored from the trackway, and trackway impulse transmitting devices and control means therefor governed by said track circuits for restoring said apparatus to its initial condition near the entrance to each clear and caution block and for again causing change of said apparatus to its changed condition at such block if it is a caution block.

54. In an automatic train control system for railroads having tracks divided into blocks, car-carried apparatus comprising an electro-pneumatic valve controlling the airbrakes of the vehicle and normally electrically energized, a speed responsive device driven from the wheels of the vehicle, and changeable speed limit means cooperating with said speed responsive device to cause de-energization of said valve whenever the vehicle exceeds a predetermined speed limit corresponding to the existing condition of said speed limit means, said speed limit means tending to assume its lowest speed condition and being maintained in higher speed conditions by a normally closed circuit on the vehicle, said speed limit means upon assuming its lowest speed condition remaining in that condition until restored by a restoring influence from the trackway, cooperating means on the vehicle and on the trackway in each block for transmitting said restoring influence near the entrance to each clear and caution block and for making a maintained break in said normally closed circuit on the vehicle at the entrance to a danger block.

55. In a system of train control for automatically regulating the speed of vehicles during their travel through the blocks of a railroad, the combination with automatic brake control apparatus on a vehicle adapted in response to control from the trackway to enforce different predetermined speed limits in clear, caution and danger blocks, of trackway impulse transmitting means associated with each block and having three distinctive controlling conditions for causing said apparatus on a passing vehicle to assume a corresponding speed limit condition, said trackway means of each block being governed automatically in accordance with the presence or absence of trains in the corresponding block and in the next block in advance, said trackway means of each block assuming one of its controlling conditions if neither the corresponding block nor the next block in advance is occupied, another controlling condition if the corresponding block is not occupied but the next block in advance is occupied, and another if the corresponding block is occupied.

56. In an automatic train control system for railroads having tracks divided into blocks, an impulse transmitting device on the trackway near the entrance to each block adapted to produce controlling influences on a passing vehicle, a source of current and control circuits for each impulse device governed by the track circuits of the corresponding block and the next block in advance, said control circuits causing each impulse device to be energized by current of one characteristic when neither the corresponding block nor the block next in advance is occupied, to be energized by a current of another characteristic if a corresponding block is not occupied but the next block in advance is occupied, and to be de-energized if the corresponding block is occupied irrespective of the occupancy of the next block in advance; and automatic brake control apparatus on a vehicle including speed responsive means and selectively responsive to the different energized and the de-energized condition of said impulse devices.

57. In a train control system for railroads having tracks divided into blocks each equipped with a track circuit, trackway means near the entrance to each block for transmitting a plurality of distinctive control impulses to passing vehicles, two control circuits for each impulse device governed by the track circuits of the corresponding block and the next block in advance, one control circuit being closed if neither the corresponding block nor the block next in advance is occupied, the other control circuit being closed if the corresponding block is not occupied but the block next in advance is occupied, and neither control circuit being closed if the corresponding block is occupied irrespective of the occupancy of the block next in advance, automatic brake control apparatus on a vehicle changeable from an initial condition to a changed condition and acting in its changed condition to set up a predetermined continuing speed limit which the vehicle cannot exceed without an automatic application of its brakes, said apparatus remaining in its changed condition until restored from the trackway, said trackway means of each block being effective to restore said apparatus to its initial condition if either of the control circuits for said means is closed.

58. In an automatic train control system for railroads having tracks divided into blocks, the combination of trackway means associated with each block adapted to assume any one of three distinctive controlling conditions, of car-carried automatic brake control apparatus including a speed responsive device driven from the wheels of the car and selectively responsive to the different controlling conditions of said trackway means.

59. In a train control system for railroads having tracks divided into blocks, automatic brake control apparatus on a vehicle having its control of the air-brakes of the vehicle dependent upon the running speed of the vehicle, control means on the vehicle for governing said apparatus differently in response to distinctive control influences transmitted from the trackway, and trackway means for transmitting one of said control influences near the entrance to each block dependent upon the presence or absence of other trains in that block only and for transmitting another control influence dependent upon the presence or absence of other trains in the block next in advance.

60. In an automatic train control system for railroads having tracks divided into blocks, apparatus on a vehicle responsive differently to currents of different electrical characteristics communicated thereto from the trackway, trackway means associated with each block and having two control circuits for communicating to said apparatus two currents of different electrical characteristics, and means for closing one control circuit of each trackway means if the corresponding block is not occupied and the next block in advance is occupied for closing the other control circuit if neither the corresponding block nor the next block in advance is occupied.

61. In a automatic train control system for railroads having tracks divided into blocks, apparatus on a vehicle responsive differently to control influences from the trackway of distinctive controlling characteristics and acting to impose corresponding speed limits which the vehicle cannot exceed without an automatic application of its brakes, influence communicating means associated with each block and having two control circuits for communicating said distinctive influences to said apparatus, and means controlled by the track circuits of said blocks for breaking both of said control circuits of the trackway means of each block if that block is occupied and for closing one of said control circuits of the trackway means of each block if that block and also the block next in advance is not occupied.

62. In an automatic train control system for railroads having tracks divided into blocks, a contact rail near the entrance to each block, trackway means for impressing a current of one polarity on each contact rail if the corresponding block and also the next block in advance are not occupied, a current of the opposite polarity if the corresponding block is not occupied but the next block in advance is occupied, and de-energizing the contact rail if the corresponding block is occupied, and automatic brake control apparatus on the vehicle including a speed responsive device connected to the wheels thereof and responding differently to the polarity and the absence of current on said contact rails.

63. In an automatic train control system for railroads having tracks divided into blocks, the combination with a contact rail energized with direct current of one polarity or another or de-energized in accordance with the location of trains ahead with respect to the contact rail, of car-carried brake control apparatus including a speed responsive device driven from the wheels of the car and responding differently to the polarity or absence of current on said contact rail, said apparatus including a coil energized by the current on the contract rail and a biased armature operated to different positions depending upon the direction of current through the coil, and a normally closed circuit on the vehicle automatically broken as it passes each ramp for maintaining said armature in the position in which it is placed by the polarity of current received from the contact rail.

64. In an automatic train control system for railroads having tracks divided into blocks, the combination with a ramp on the track automatically energized with current of one polarity or another or de-energized dependent upon traffic conditions in advance, a contact shoe on a vehicle mechanically and electrically cooperating with said ramp, contacts on the vehicle opened upon engagement of said shoe with the ramp, electrical responsive means on the vehicle electrically connected to said shoe and having a biased movable armature shifted to one or the other of two extreme positions dependent upon the polarity of current on the ramp with which the shoe is then engaged, said armature being automatically maintained in the extreme position which it assumes upon passing a ramp until another ramp is encountered, and automatic brake control apparatus on the vehicle including a centrifugal speed device driven from the wheels of the vehicle for setting up different predetermined speed limits which the vehicle cannot exceed without an automatic brake application and which corresponds with the position of said armature.

65. In a train control system for railroads divided into blocks, trackway means associated with each block and adapted to assume any one of three different controlling conditions, said trackway means being effective assuming one of its controlling conditions in a clear block, another condition in a caution block, and the third condition in a danger block, brake control apparatus on a vehicle responsive to the controlling conditions of said trackway means and acting automatically to set up maximum, intermediate and minimum speed limits corresponding to said three different controlling conditions.

66. In an automatic train control system, the combination with brake control apparatus on a vehicle including a speed responsive device driven from the wheels of the vehicle and normally energized circuits and devices tending to assume a minimum speed condition in which the brakes of the vehicle are automatically applied if it exceeds a predetermined minimum speed, a circuit on the trackway for transmitting electrical current to the vehicle for controlling said apparatus, a source of current on the trackway, and traffic controlled means for reversing the connections between said circuit and the terminals of said source.

67. A system for automatically controlling railway vehicles comprising means for indicating the actual speed of said vehicle, an element representing a predetermined functional relation between the distance traveled by said vehicle and its speed, an electrically operated warning signal, electrically operated mechanism for controlling the movement of said vehicle, circuit controlling devices for controlling the operation of said warning signal and said mechanism, and means responsive to the combined action of said first mentioned means and said element for operating said circuit controlling devices.

68. A system for automatically controlling railway vehicles comprising means for indicating the actual speed of said vehicle, an element representing a predetermined functional relation of the distance traveled by said vehicle and its speed, a warning signal, mechanism for controlling the movement of said vehicle, and means responsive to a predetermined cooperation of said means and said element for operating said warning signal and said mechanism successively after a predetermined interval.

69. In a system for protecting traffic on railroad tracks, the combination with automatic apparatus on a vehicle responding to the actual speed of the vehicle, of means partly on the vehicle and partly along the track for establishing a permissive speed for the vehicle in accordance with the extent of unoccupied track in advance thereof, a warning signal governed jointly by said apparatus and said means and operated when the actual speed of the vehicle exceeds its prescribed permissive speed, and brake controlling means on the vehicle also governed jointly by said apparatus and said means and operated at an interval of delay following the operation of said warning signal.

70. In an automatic train control system, automatic train control apparatus for a railway vehicle including a changeable permissive speed device, gearing on the vehicle adapted to regulate the change of the permissive speed device in accordance with the progress of the vehicle along the track, a brake setting appliance on the vehicle, a warning signal on the vehicle, a speed responsive device governed by the speed of the vehicle, means controlled jointly by the permissive speed device and the speed responsive device for operating said warning signal and said brake setting appliance in succession with an intervening interval of delay whenever the actual speed of the vehicle exceeds the prescribed permissive speed, and means partly on the vehicle and partly along the track for governing the operation of said gearing and acting to vary the extent of change of the permissive speed device in accordance with the distance between the vehicle and another vehicle ahead.

71. In combination, a railway vehicle, vehicle controlling means thereon, means for controlling said vehicle controlling means comprising a speed controlled part and a speed limit part, electrical means governed by the polarity of current supplied thereto for controlling said speed limit part on the vehicle; electrical means along the trackway cooperating with said third mentioned means to cause currents of different polarity to be supplied thereto.

72. In combination, a railway vehicle, vehicle controlling means thereon, means for controlling said vehicle controlling means comprising a speed controlled part and a speed limit part; electrical means governed by the polarity of current supplied thereto for controlling said speed limit part on the vehicle; electrical means along the trackway cooperating with said third mentioned means to cause currents of different polarity to be supplied thereto and signals on the vehicle indicating the control of said speed limit device effected.

73. In a system for protecting traffic on railroad tracks, the combination with stationary impulse transmitting devices distributed along the track, each adapted to assume any one of a plurality of different controlling conditions, of means associated with each of several predetermined portions of the track and assuming an electrical condition in accordance with the presence of a train on the corresponding portion, whereby the controlling condition of a number of impulse transmitting devices in the rear of an occupied portion are conditioned in accordance with the distance between each particular device and said occupied portion of track, and means on the following vehicle responsive jointly to its speed and the varying electrical conditions of said impulse transmitting devices for automatically controlling the movement of the following vehicle.

74. In a system for protecting railway traffic, in combination: a track; a vehicle, adapted to travel on said track; means responsive to electrical energy of different characteristics for governing the speed of said vehicle; and means for supplying electrical energy to said means at different control points along the track, said last mentioned means varying the electrical characteristics of said energy progressively in accordance with the extent of unoccupied track in advance of the vehicle.

75. In a train control system, the combination of a track with a vehicle thereon, a centrifuge comprising a sliding member operated by the speed of said vehicle and a controlling mechanism, said mechanism operated by said sliding member through a lever with unequal arms.

WINTHROP K. HOWE.